United States Patent
Ganapathy et al.

(10) Patent No.: US 11,164,189 B2
(45) Date of Patent: Nov. 2, 2021

(54) VIRTUAL REGISTER LOOK AHEAD ENGINE

(71) Applicant: Bank of America Corporation, Charlotte, NC (US)

(72) Inventors: Srini Ganapathy, Charlotte, NC (US); Jane M. Cannon, Indian Land, SC (US); Aleksandra Stein, Charlotte, NC (US); Paul Hart, Charlotte, NC (US); Dennis W. Carwile, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/424,086

(22) Filed: May 28, 2019

(65) Prior Publication Data

US 2020/0380528 A1 Dec. 3, 2020

(51) Int. Cl.
*G06Q 20/42* (2012.01)
*G06F 16/21* (2019.01)
*G06Q 20/40* (2012.01)

(52) U.S. Cl.
CPC ............. *G06Q 20/42* (2013.01); *G06F 16/21* (2019.01); *G06Q 20/405* (2013.01)

(58) Field of Classification Search
CPC ....... G06Q 20/42; G06Q 20/405; G06F 16/21
See application file for complete search history.

(56) References Cited

U.S. PATENT DOCUMENTS

| | | | |
|---|---|---|---|
| 7,428,302 B2 | 9/2008 | Zirngibl et al. | |
| 8,655,661 B2 | 2/2014 | Hymel et al. | |
| 8,738,450 B2 | 5/2014 | Mon et al. | |
| 8,744,914 B2 | 6/2014 | Mon et al. | |
| 9,824,188 B2 | 11/2017 | Brown et al. | |
| 10,803,432 B1* | 10/2020 | Miles | G06K 7/10 |
| 2010/0217706 A1 | 8/2010 | Griffin et al. | |
| 2013/0346302 A1* | 12/2013 | Purves | G06Q 20/108 |
| | | | 705/40 |
| 2015/0193869 A1* | 7/2015 | Del Vecchio | G06Q 40/02 |
| | | | 705/42 |
| 2017/0132520 A1* | 5/2017 | Burroughs | G06N 5/04 |
| 2019/0122307 A1* | 4/2019 | Sayed | G06Q 20/389 |
| 2020/0074565 A1* | 3/2020 | Dotter | G06F 16/285 |
| 2020/0098053 A1* | 3/2020 | Lesner | G06N 3/08 |

* cited by examiner

*Primary Examiner* — Scott C Anderson
*Assistant Examiner* — Matthew Cobb
(74) *Attorney, Agent, or Firm* — Banner & Witcoff, Ltd.; Michael A. Springs

(57) ABSTRACT

A virtual assistant computing system may include a user device and a virtual assistant computing system. The virtual assistant computing system may include a first processor and a first non-transitory memory configured to receive, via a network from the user device, an input corresponding to a future electronic transaction expected to be initiated by a user and analyze information corresponding to the future electronic transaction to predict based on and a plurality of scheduled electronic transactions received from an external computing system, a future state of an electronic account associated with the user. The virtual assistant computing system may then cause display, on the user device via a network, a visualization of the future state of the electronic account based on the future electronic transaction and the plurality of scheduled electronic transactions.

20 Claims, 6 Drawing Sheets

VIRTUAL REGISTER LOOK AHEAD ENGINE

FIELD OF THE DISCLOSURE

Aspects of the disclosure relate to interactions between a user of a mobile device and an artificial-intelligence-based virtual assistant. More specifically, aspects of the disclosure relate to generating predictive user interface screens allowing a user to view and manage future electronic transaction events.

BACKGROUND

Software applications have been developed to provide tools and techniques to help individuals manage their personal finances. For example, individuals may utilize various online budgeting tools to help them identify and manage their various expenses. While such budgeting tools may be useful to these individuals for general budget management, there remains room for improvement. For example, a need has been recognized for functionality to track and identify upcoming, non-recurring electronic transactions, providing an easily understandable visualization of a predicted future state of one or more accounts, and reconcile the predicted future state of the one or more accounts with actual future electronic transactions.

SUMMARY

The following presents a simplified summary in order to provide a basic understanding of some aspects of the disclosure. The summary is not an extensive overview of the disclosure and is intended neither to identify key or critical elements of the disclosure nor to delineate the scope of the disclosure. The following summary merely presents some concepts of the disclosure in a simplified form as a prelude to the description below. Aspects of the disclosure relate to systems, methods, and apparatuses for providing improved correlation between monitored electronic transactions and a predictive visualization screen showing an effect of expected future electronic transactions on a user account. In an illustrative example, a virtual assistant computing system may include a user device and a virtual assistant computing system. The virtual assistant computing system may include a first processor and a first non-transitory memory configured to receive, via a network from the user device, an input corresponding to a future electronic transaction expected to be initiated by a user and analyze information corresponding to the future electronic transaction to predict based on and a plurality of scheduled electronic transactions received from an external computing system, a future state of an electronic account associated with the user. The virtual assistant computing system may then cause display, on the user device via a network, a visualization of the future state of the electronic account based on the future electronic transaction and the plurality of scheduled electronic transactions.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
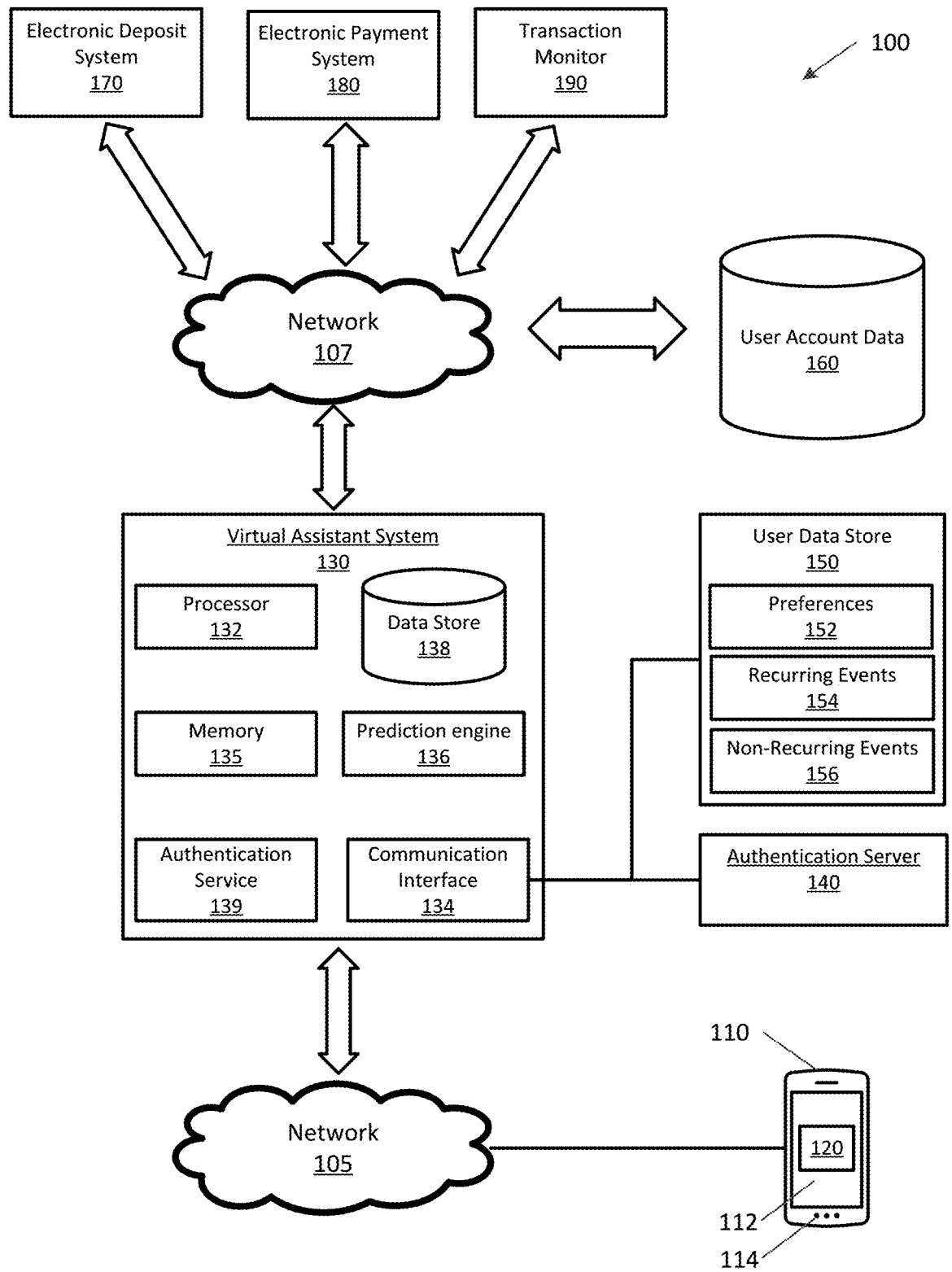
FIG. 1 shows an illustrative artificial intelligence virtual assistant computing system according to one or more aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In some cases, an artificial intelligence (AI) virtual assistant may include functionality to facilitate user interaction via a mobile device to perform one or more desired activities, such as electronic transaction management activities (e.g., budgeting activities and the like) and performance and/or scheduling of one or more electronic transactions (e.g., scheduling a bill-pay transaction, initiating an electronic funds transfer, and the like. By including "Look Ahead" functionality, improves the operation of the AI virtual assistant to allow a user to visualize and reconcile upcoming, non-recurring transactions, providing users a simplified user interface screen visualizing a future financial state. In some cases, the AI virtual assistant may be capable of monitoring electronic transactions to reconcile actual electronic transactions with predicted financial activity. This will allow the user to create a what-if scenario that shows potential balance outcomes and display a virtual register displaying recurring and/or ad hoc electronic transactions.

The time horizon of "Look Ahead" may be determined by the customer (e.g. 1 month, 2 months, 6 months, and the like). In some cases, the user may configure thresholds to allow alerts to be generated by the AI virtual assistant when predicted recurring and/or non-recurring electronic transactions may cause generation of undesired fees. The tool will improve user planning to ensure available funds will exist at various predicted future dates.

In some cases, the AI virtual assistant service may interact with other networked computing systems managing and/or monitoring electronic transactions associated with the user. For example, the AI virtual assistant may generate predicted virtual registry entries based on information from one or more online computing systems, such as recurring deposit electronic transactions from an electronic deposit computing system, bill-pay electronic transactions from a bill-pay computing system, and/or one or more customer preferences (e.g., budget information, minimum threshold information, and the like). With additional user inputs of non-recurring electronic transaction events, and their associated timeframes, the AI virtual assistant may predict a projected timeframe of predicted future electronic transactions, generate a virtual register as a user interface screen, and cause display of the virtual register user interface screen on display screen of a remote user device (e.g., a mobile device).

In some cases, a user may access an application on a mobile device that may be used to facilitate entry of a future anticipated non-recurring expense, such as by leveraging a natural language processing (NLP) interface. The AI virtual assistant may use the converted NLP data to compare an expense description with one or more other expense descriptions in budgets or similar anticipated expense labels from the same user, or other customers. The AI virtual assistant may determine if the anticipated expense falls within a specified numerical range, or if the anticipated electronic transaction may be an outlier. In some cases, the AI virtual assistant may output a proposal to the user to modify the anticipated expense based on a determination that an associated transaction amount may be high or low relative to the data used in the comparison.

In some cases, when an anticipated non-recurring expense is added, natural language processing and/or machine learning may be used to identify one or more actual electronic transactions when they occur in the future. Upon identifying one or more electronic transactions, the AI virtual assistant may prompt the user to mark the expense as belonging to one of the anticipated expenses previously added. This confirmation input may be used to support reinforcement learning of the natural language processor engine and/or the machine-learning algorithm to improve the ability of the system to identify actual expenses associated with customer-added anticipated expenses. Based on one or historical records of electronic transactions linked with entered anticipated expenses, the AI virtual assistant may determine whether users over estimate or under estimate similar expenses, either individually or as a group. Base on this assessment, the AI virtual assistant may improve the prediction algorithm by providing a suggestion that a particular anticipated expense entry may be higher or lower based on the analysis of similar estimates.

FIG. 1 shows an illustrative artificial intelligence virtual assistant computing system 100 according to one or more aspects of the disclosure. The illustrative artificial intelligence virtual assistant computing system 100 is only one illustrative example of a suitable computing environment and is not intended to suggest any limitation as to the scope of use or functionality described in this disclosure. The artificial intelligence virtual assistant computing system 100 should not be interpreted as having any dependency or requirement relating to any one or combination of components shown in the illustrative computing system environment. In some cases, the virtual assistant computing system 100 may include a user device 110 communicatively coupled to a virtual assistant system 130 via a network 105. The virtual assistant system 130 may be communicatively coupled to one or more additional computing systems, such as an authentication server 140, an electronic deposit computing system 170, an electronic payment system 180, and/or a transaction monitor, such as via a communication interface 134 and/or a network 105 or 107 (e.g., a private network, a LAN connection, a WAN connection, a cellular network, the Internet, and the like). In some cases, the virtual assistant computing system 103 may be communicatively coupled to one or more networked data stores, such as a user account data store 160, and/or a user data store 150.

The virtual assistant system 130 may include a processor 132, one or more memory devices 135, and a communication interface 139. The processor 132 of the virtual assistant system 130 may process instructions stored in one or more of the memory devices 135 to manage and/or access a data store (e.g., a virtual assistant data store 138) and/or to process one or more computing engines and/or services (e.g., a prediction engine 136, an authentication service 139) and the like.

In some cases, the processor 132 may control all or a portion of the overall operation of the virtual assistant system 130 and the associated components including the one or more memory devices 135, the communication interface 134, the prediction engine 136, the authentication service 139, and the like. The virtual assistant system 130 may also include a variety of computer readable media. The computer readable media may be any available media that may be accessed by the virtual assistant system 130 and include both volatile and nonvolatile media, removable and non-removable media. By way of example, and not limitation, computer readable media may comprise a combination of computer storage media and communication media.

Computer storage media, such as one or more of the memory devices 135 may include volatile and nonvolatile, removable and non-removable media implemented in any method or technology for storage of information such as computer readable instructions, data structures, program modules or other data. The computer storage media may include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the virtual assistant system 130.

In some cases, the user data store 150 may store a plurality of data records associated with each of a plurality of users. Such data records may include a user preference data store 152, a recurring event data store, a non-recurring event data store, and the like. In some cases, the user data store 150 may be stored in a data repository of the virtual assistant system 130, such as the data store 138. In some cases, at least a portion of the user data store may be located on a computing device of an enterprise computing system external to the virtual assistant system 130. User preference information may include parameters to configure the virtual assistant system to perform one or more functionalities, including a preferred categorization for presentation of electronic transactions, a time period during which a look ahead process is to occur, whether previous look ahead transactions are to be stored, archived or deleted once the look ahead time period has expired, one or more accounts to be associated with candidate look ahead transactions, whether to perform automatic matching of candidate look ahead transactions, whether to allow a user to verify identified candidate look ahead transactions, whether a user is to submit electronic transactions that match look ahead electronic transaction entries in the virtual ledger, and/or the like.

In some cases, the memory device 135 may store instructions for running one or more are applications and/or storing other information representing application data for use while the virtual assistant system 130 is operational. Additional the memory device 135 may include corresponding software applications and/or services (for example, software tasks), that may run and/or may be running on the virtual assistant system 130 and/or communicate with an application running on one or more remote computing devices, such as the mobile device 110. In some cases, one or more data structures may be used to store authentication information, image data and/or associated metadata and the like. For example, the memory device 135 may be used to store data captured at the mobile device, such as a audio data and/or text data captured at one or more user input devices of the user device 110. In some cases, the audio data may be stored in a raw state or a processed state. Additionally, metadata associated with the audio data and/or textual data may be stored in the memory 135 or the data store 138, such as date information, time information, location information, and/or user data and the like.

Computer-executable instructions may be stored within the one or more memory device 135 to provide instructions to the processor 132 for enabling the virtual assistant system 130 to perform various functions, such as prediction of future electronic transactions, generating a virtual register user interface screen, reconciling electronic transactions with previously anticipated expenses, and the like. For example, the memory device 135 may store computer-executable instructions used by the virtual assistant system 130, such as an operating system, one or more application programs, one or more services, and an associated database. Alternatively, some or all of the computer executable instructions for the virtual assistant system 130 may be embodied in hardware or firmware (not shown).

In some cases, illustrative virtual assistant system 130 may include processing of instructions stored on forms of computer-readable media. Computer-readable media include any available media that can be accessed by a computing device, such as the virtual assistant system 130. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism. The memory device 135 may include one or more program modules having instructions that when executed by the virtual assistant system 130 may cause the virtual assistant system 130 to perform one or more functions described herein.

Although not required, various aspects described herein may be embodied as a method, a data processing system, or as a computer-readable medium storing computer-executable instructions. For example, a computer-readable medium storing instructions to cause the processor 132 to perform steps (blocks) of a method in accordance with aspects of the invention is contemplated. For example, aspects of the method steps disclosed herein may be executed on by the processor 132 of the virtual assistant system 130. Such a processor may execute computer-executable instructions stored on a computer-readable medium.

The mobile device 110 may comprise a mobile phone, or other computing device (e.g., a laptop computer, a desktop computer, a tablet computing device, and the like) upon which a mobile application 120 (e.g., a mobile banking application, and the like) is installed and running. In some cases, the mobile device includes a processor and a memory device, wherein code stored in the memory device may be run by the processor to facilitate operation of the mobile application 120. In some cases, the mobile device may include one or more user input/output devices, such as a screen 112 (e.g., a touch screen), a microphone 114, a speaker, and/or other input/output devices. In some cases, the mobile application 120 may be configured to capture text-based user inputs via the screen and/or audio-based user inputs via the microphone 114. In some cases, captured user inputs may be communicated to the virtual assistant system 130 via the network without processing. In some cases, the captured user inputs may be at least partially processed. An illustrative captured user input may be an audio signal of the user that may be processed by a natural language processing engine to identify an input of a predicted future expense, including an amount and a date (or date range) of the expected future expense. Optional information may include a category (e.g., food, gift, auto, home, and the like), a merchant, a product or service to be purchased, and the like.

In some cases, the virtual assistant computing system 130 may include one or more processors, memory devices and a communication interface to facilitate communication via an enterprise computing network, such as network 107. The virtual assistant computing system 130 may be configured to access user account data from the data store 160 to facilitate monitoring and/or analysis of a plurality of electronic transactions corresponding to an associated user account. In some cases, the virtual assistant computing system 130 may communicate with one or more enterprise computing systems, such as a direct deposit computing system designed to manage electronic payments transferred from a first enterprise computing system to a second enterprise computing system (e.g., an employer's banking computing system to an employee's banking computing system). In some cases, the electronic deposit computing system 170 may process automatic electronic transactions sent from the first enterprise computing system to a second enterprise computing system, where each electronic transaction includes an identifier of a first account (e.g., the employer's banking account), an identifier of a second account (e.g., the employee's banking account), electronic routing information, a transferred amount, a date and/or time stamp, and/or a frequency indicator for related electronic transactions. In some cases, the electronic deposit computing system 170 may process electronic deposit transactions on a periodic basis, such as weekly, biweekly, monthly, or the like. Further, the electronic deposit computing system 170 may facilitate occasional or infrequent electronic transactions, such as a tax refund electronic transaction or the like.

The electronic payment system 180 may comprise a computing system configured to manage one or more electronic payments made between financial institutions, companies, individuals, and/or the like. As such, the electronic payment system 180 may facilitate electronic transactions for transferring value between parties. For example, the electronic payment system 180 may facilitate electronic transactions provide payment between parties to an exchange of goods and/or services. In some cases, an electronic payment system may comprise a credit card and/or a debit card processing system, a bank transfer system, a bill-pay system, an electronic wallet, a smart card system, an e-currency computing system, or the like. Illustrative devices of an electronic payment systems may include credit card readers and/or terminals, integrated point of sale computing devices, a mobile device payment application running on a user device, a web payment computing system, such as a payment system integrated into a commercial website, a banking bill-payment computing system, an electronic currency computing system incorporating blockchain technology, and/or other computing systems capable of transferring an agreed upon value between parties in an electronic transaction for goods and/or services.

The transaction monitor 190 may comprise one or more computing devices and/or systems configured to monitor a plurality of electronic transactions processed by an enterprise computing system. For example, an enterprise computing system may incorporate the transaction monitor 190 to monitor a plurality of electronic transactions processed by the enterprise computing system, including electronic deposit transactions, electronic transfer transactions and/or electronic payment transactions, where at least one account managed by the enterprise computing system is a party to the monitored electronic transaction. In some cases, the transaction monitoring system 190 may monitor electronic transactions made from or to the enterprise computing system to meet the requirements of one or more governmental regulations.

In some cases, the transaction monitor 190 may be configured store information about one or more predicted electronic transactions, such as a date, an approximate amount, an account number, a vendor identifier, a vendor category identifier and/or the like. In some cases, the transaction monitor may be configured to interface with the virtual assistant system 130 and/or the user data store 150 to populate a data store and/or data structures to facilitate identification of candidate electronic transactions that satisfy at least some elements of an expected electronic transaction predicted on the virtual register user interface screen. For example, the transaction monitor 190 may store a plurality of transaction data records including an account number, an expected date range during which an electronic transaction is expected to occur, an approximate value range for a candidate electronic transaction and the like. The transaction monitor 190 may use the stored transaction data records to identify one or more electronic transactions associated with one or more particular user accounts that may be candidates of being a match for one or more "look ahead" electronic transactions. Once identified, corresponding electronic transaction records may be communicated to the virtual assistant system 130 for additional matching, such as being matched to a record stored in a recurring events repository 154 and/or a non-recurring events repository 156 of the user data store 150.

The authentication server 140 may include a processor, one or more memory devices, and a communication interface. The processor of the authentication server 130 may process instructions stored in one or more of the memory devices to manage and/or access a data store (e.g., an authentication database) and/or to process one or more computing services (e.g., an authentication service) and the like. The virtual assistant system 130 may invoke a process instance to authenticate the user, such as the authentication service 139. The authentication service 139 may be a unique instance associated with a particular log in request of the user into the mobile application 120 and/or may be associated with a particular functionality of the virtual assistant system 130, such as a look ahead request. In an illustrative example, a new or existing authentication service may be invoked upon a login request to the virtual assistant system 130 form the user device 110. The authentication service 139 may coordinate secure and/or encrypted communication between the user device 110, the virtual assistant system 130, and the authentication server 140, such as to communicate user identification information obtained from the mobile device, such as password/passcode information, fingerprint information, voice information, image information, and the like. In some cases, the authentication process may occur at the user device level, the virtual assistant system 130 level, the authentication server 140 level, or as a combination of the same.

Communication between the user device 110, the virtual assistant system 130 and the authentication server 140 may be performed over one or more communication networks, such as a WAN, a LAN, the Internet, a cellular communication network, a private network, and the like. In some cases, the authentication service 139 may be a unique instance associated with a particular request (e.g., a particular user log-in request) or with the virtual assistant system 130. In some cases, the authentication service 139 may be configured to provide authentication services to multiple user devices at a particular location or user devices at different geographic locations. The authentication service 139 may authenticate the user via facial biometric information and associate the user request to a particular matched user identifier (e.g., a party ID) and/or a global unique identifier (GUID) corresponding to a user matching the authenticated facial biometrics that may be stored as part of the user account data store 160. The authentication server 140 may receive the user data the user device and compare one or more portions of that data (e.g., a user name, a user account, a card identifier, facial biometrics identifiable from a user image, a audio fingerprint associated with the user, and the like) to user identifiers associated with the user of the user device stored in the user account data store 160. After completion of the user authentication process, the authentication service 139 may cause the authentication server 140 to return a matched personal identifier (PID) and GUID corresponding to the user of the user device to the virtual assistant system 130.

Figure 2:
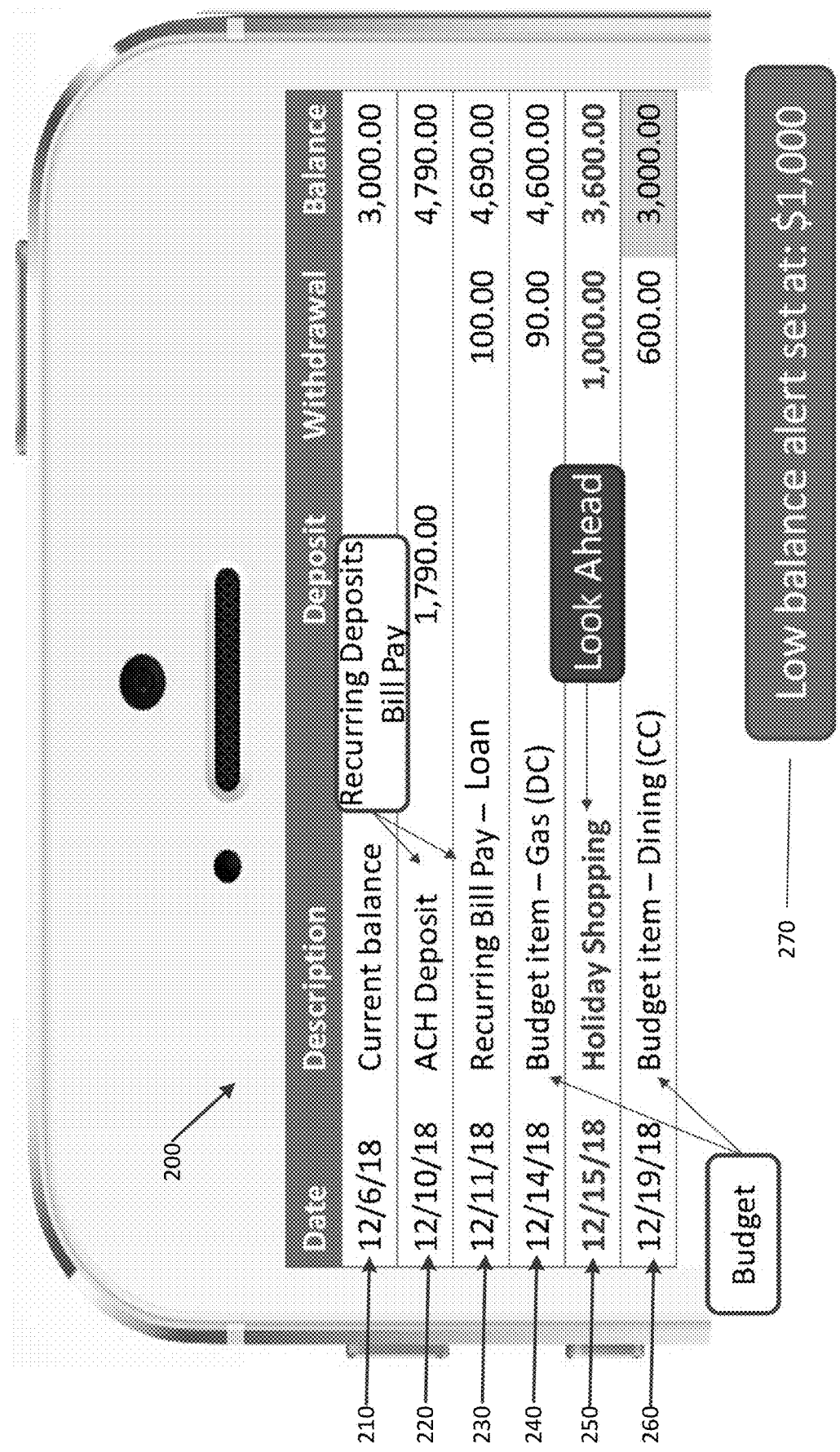
FIG. 2 shows an illustrative virtual register user interface screen according to one or more aspects of the disclosure.

FIG. 2 shows a portion of an illustrative virtual register user interface screen 200 according to one or more aspects of the disclosure. In some cases, the virtual assistant computing system 130 may cause a virtual register user interface screen 200 to be displayed on the user device via the mobile application 120. The virtual register user interface screen 200 may include one or more entries associated with recurring electronic transactions, budgeted events associated with the user, and/or one or more one-time events such as a look ahead event 250. In this illustrative example, the virtual register user interface screen 200 may be presented in a format familiar to a user, such as a virtual check register, but other user interface formats may be contemplated.

In an illustrative example, the user of the mobile device may trigger the virtual assistant computing system 130 to enter a new look ahead event transaction. Such transactions may be entered as a new data element in the user data store as a verbal description, such as "Enter a new look ahead event, for December 12, to budget $1000 for holiday shopping," "Enter a new look ahead event, for December to purchase a new grill for $599, plus tax," or "Enter a new recurring look ahead event, starting December for 30 months for a new car load for $300 per month." Once the data entry is created, the user may trigger generation of a virtual register user interface screen via a voice command, a textual command, a menu-driven command, a touch screen input command or the like. In response, the virtual assistant computing system 130 may automatically generate a virtual register screen listing one or more potential electronic transactions including the look ahead event, one or more budget electronic transaction events, one or more recurring events, and the like. For example, the illustrative virtual register user interface screen 200, may include a starting balance entry 210, an electronic deposit transaction 210, a recurring bill pay electronic transaction 220, a budget line item 240 and 260, and a look ahead line item 250. The virtual register user interface 200 may provide a view similar to a check register showing a visual representation of an electronic funds transfer (e.g., an electronic deposit event, an electronic debit event, and the like) and/or a budget entry representative of a planned expense. In some cases, the mobile application may provide an indication of a low balance alert 270, such as in a popup window. In some cases, a user may enter a new alert entry value via an audio input, a text input, or other input provide via the touch screen of the mobile device, such as a radio button, a slider, and the like. In some cases, the low balance entry may default at a particular value (e.g., 0, 100, 1000, or the like). In some cases, the low balance alert may correspond with a percentage of a starting available balance.

Figure 3:
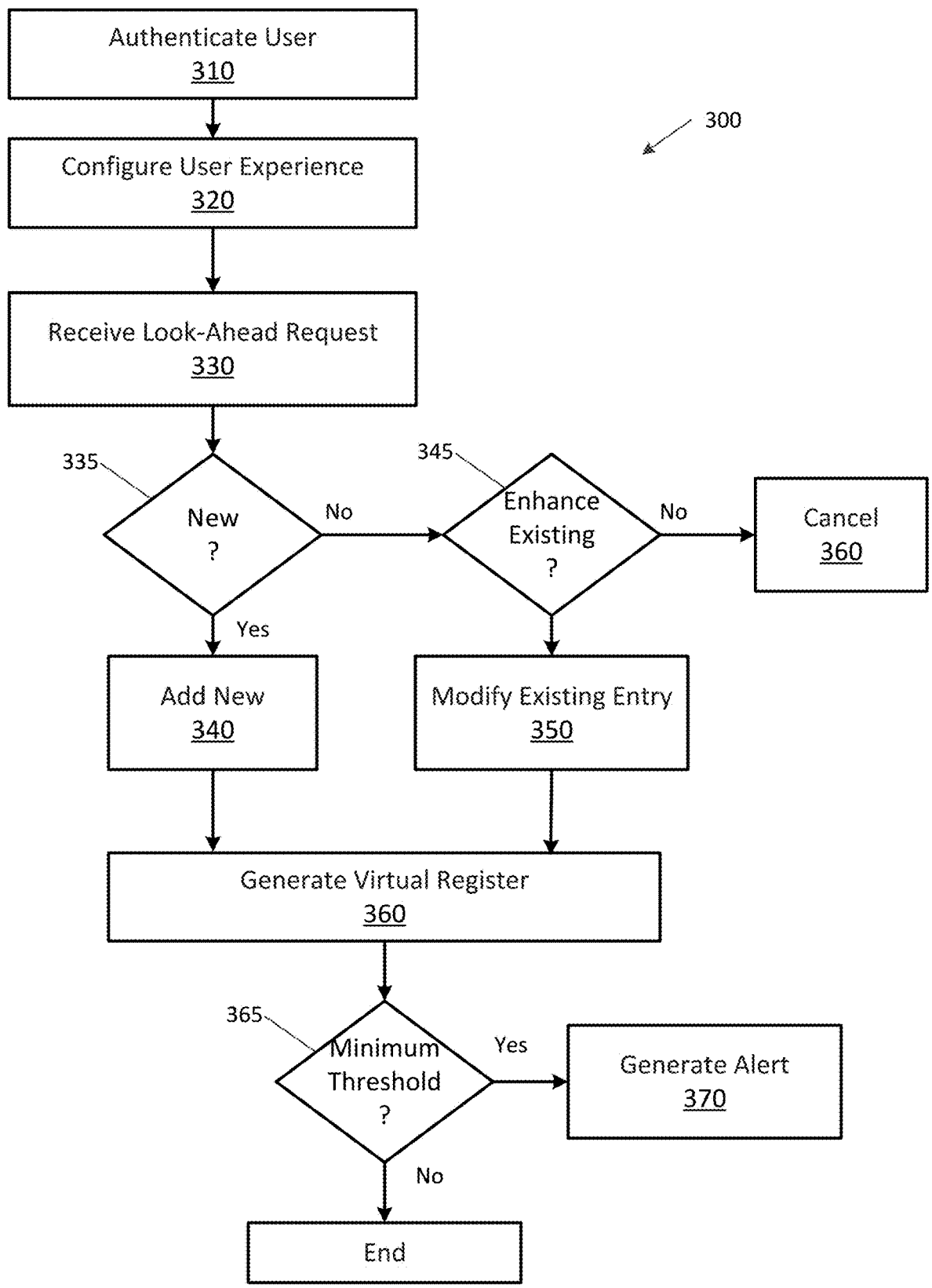
FIG. 3 shows an illustrative flow diagram showing a method for generating a virtual register user interface screen according to one or more aspects of the disclosure.

FIG. 3 shows an illustrative flow diagram showing a method 300 for generating a virtual register user interface screen according to one or more aspects of the disclosure. At 310, the mobile application 120 running on the mobile device 110, or other computing device, may initiate a user authentication process upon a login request from a user. The mobile application 120 may locally authenticate the user, such as via a pass code, a personal identification number, a fingerprint scan, or the like. In some cases, the mobile application may interact with a remote computing system, such as the virtual assistant computing system 130 to authenticate the user via an authentication service 139 and/or the authentication server 140 via a network connection.

Once the user is authenticated at 310, at 320 the mobile application 120 and/or the virtual assistant computing system 130 may configure a user experience such as by loading one or more user preferences and/or other user information such as from the user account data store 160, the user data store 150 including one or more user preferences 152, recurring events 154, and or non-recurring events 156. In some cases, the user preferences may configure a "look and feel" of the user interface of the mobile application 120 running on the mobile device 110. At 330, a user may input a look ahead request via a voice activated entry using a microphone of the mobile device and/or another input device such as the touchscreen of the mobile device 110. In some cases, the user may provide a time and/or a date (or range of times or dates) during which the look ahead transaction may occur. In some cases, the virtual assistant 130 may analyze a look ahead transaction event and identify an opportunity to generate and present to the user via a user interface screen, an electronic offer for a loan product or credit card.

In some cases, the user may provide a plurality of look ahead events, such as electronic transaction associated with upcoming birthdays, holidays or other life events, such as a wedding, divorce, purchase of a home, purchase of a vehicle and the like. In some cases, the virtual assistant computing system may prompt a user to one or more additional look ahead events, such that a side-by-side comparison screen may be generated and caused to be presented to the user via a user interface screen on the mobile device 110. In some cases, a user may utilize a different device to enter look ahead events, such as via an ATM, a personal computer, a computing kiosk or other such computing devices. In some cases, the look ahead item entry may be performed via a voice input through a natural language processing engine or a textual entry processed via a machine learning engine. In some cases, the mobile application may allow a user to provide a link to a website or website shopping cart or wish list to identify a price and/or category of the look ahead item. In some cases, the user may use the user device microphone to provide an audio input naming of a website and product and cause the mobile application to automatically load a current price (with/or without applicable taxes/shipping costs, gratuity, etc.). In some cases, the virtual assistant may suggest possible sale price of products as date nears, based on a preferences setting, or otherwise provide a user output listing suggested similar items, or the like.

At 335, the virtual assistant computing system 130 may check whether the look ahead event is new or related to an existing event. If new, the virtual assistant computing system 130 may generate a new look ahead data entry at 340 in a data store (e.g., the data store 150). If the entered look ahead event is not new, then at 345 the virtual assistant computing system 130 may enhance an existing entry at 350 by modifying a date, an amount or other parameter of the look ahead event. In some cases, the enhancement may be one or more other possible variations of the look ahead event to be viewed in a side-by-side comparison visualization window on the user device 110. If the look ahead event is not an enhanced data entry at 345, then the virtual assistant computing system 130 may cancel the entry at 360.

At 360, the virtual assistant computing system 130 may analyze the look ahead event with other recurring electronic transactions and budget entries or non-recurring electronic transactions or budget entries using one or more predictive models, such as a seasonal trend model, a demographic trend model or the like. In some cases, the virtual assistant computing system 130 may process a look ahead event based on user preferences and/or a learned user preference based on a machine learning algorithm. In some cases, multiple electronic transactions may be clustered in a clustering analysis, such as across a household, to identify a trend in deposit or withdrawal electronic transactions. For example, the virtual assistant computing system 130 may identify one or more life events, such as a wedding, a home purchase, a birth of a child, an upcoming entry to an educational institution, based on a series of electronic transactions, budget items and/or look ahead events. In such cases, the virtual assistant computing system 130 may cause a user interface screen to be presented to the user asking whether a particular life event is occurring or about to occur. In some cases, the virtual assistant computing system 130 may suggest one or more other transactions or look ahead events to be entered into the virtual register 200, such as a new contribution electronic transaction to a college saving plan, a savings account for a down payment on a house or vehicle, or a series of look ahead events to allow for a comparison of an effect due to different monthly payments from a purchase of a vehicle or home over a specified purchase price range or down payment range, interest rate range and the like. Once the virtual register is generated at 360 and/or presented to the user via the user interface screen, the virtual assistant computing system may, at 365, compare a balance with a minimum threshold and generate an alert at 370 if the threshold condition were met. In some cases, an audio tone may be generated, a visual indicator may be presented such as by highlighting an entry in the virtual register, or presenting the information in a pop-up window on the user's computing device display. In some cases, the alert may include one or more suggestions to avoid meeting the minimum threshold amount, such as by presenting a video or other educational materials or product offerings.

Figure 4:
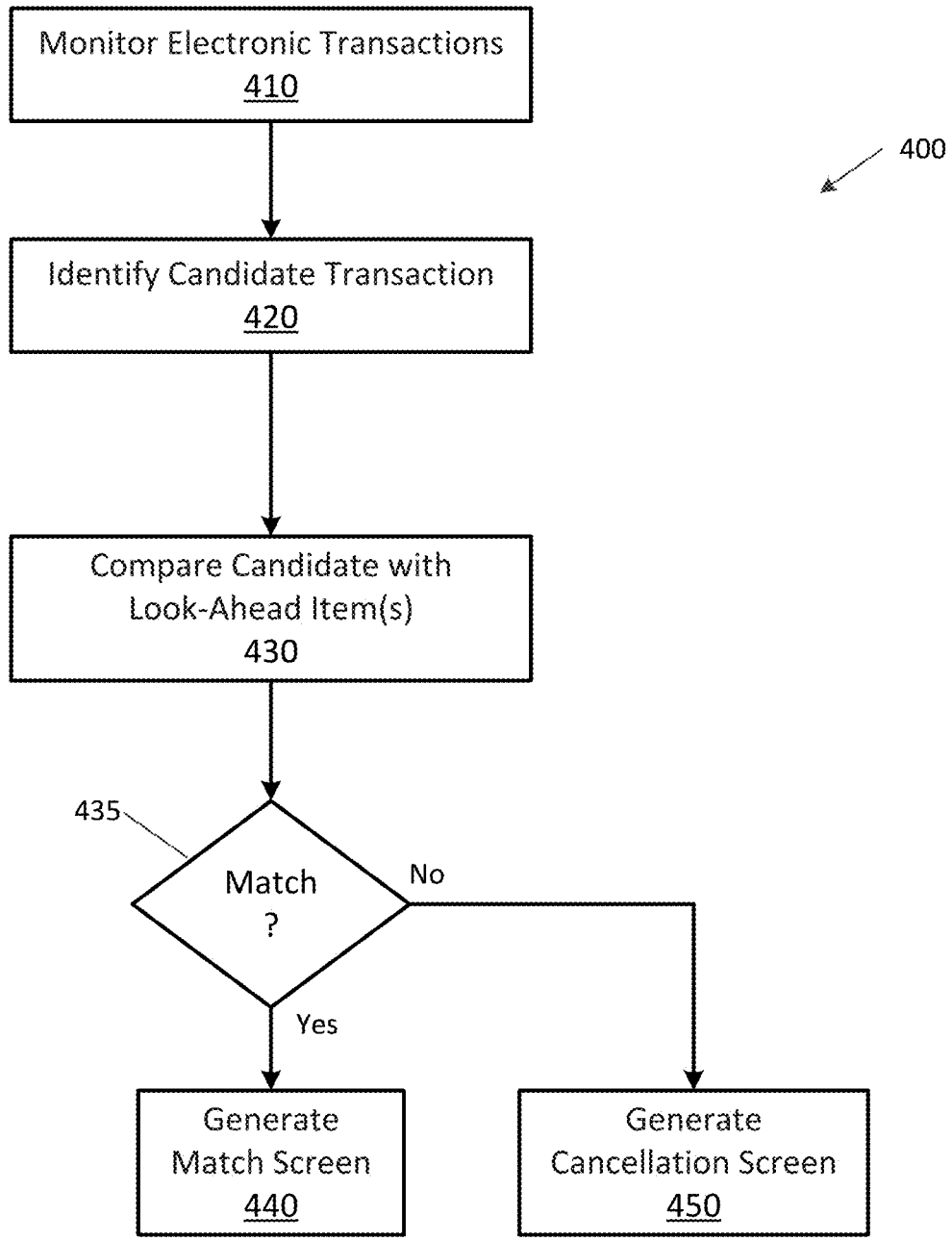
FIG. 4 shows an illustrative flow diagram showing a method for reconciling electronic transactions with a predicted virtual register user interface screen according to one or more aspects of the disclosure.

FIG. 4 shows an illustrative flow diagram showing a method 400 for reconciling electronic transactions with a predicted virtual register user interface screen according to one or more aspects of the disclosure. Once the look ahead entry has been entered and/or stored in the data store 150, or other data store, the virtual assistant computing system 130 may monitor electronic transactions via the network 107 based on communications with one or more of the electronic deposit system 170, the electronic payment system, and/or the transaction monitor 190. At 420, the virtual assistant computing system 130 may identify one or more candidate transactions that may meet one or more parameters matching a look ahead event, such as a price match, a date range match, a vendor match, or a category match (e.g., a vehicle category, a real estate category, an educational category, and the like). In some cases, a learning engine may identify multiple transactions that may be related, such as a purchase of a boat and trailer from different vendors, or the like. In some cases, the virtual assistant computing system 130 may compare the identified candidate transactions to one or more look ahead event via a matching algorithm to find a best fit matching one or more identified electronic transactions with one or more stored look ahead events.

If, at 435, a match was identified, the virtual assistant computing system 130 may cause a match screen user interface to be presented to the user on a user device at 440, such as by displaying the look ahead event with each of the identified electronic transactions that may be a match to the look ahead event. If a match is further verified, a learning engine may enhance a model to be used in future matching cases of similar events and/or categories of look ahead events. If at 435, no clear match was found, the virtual assistant learning engine may output to the user, via a user interface screen (e.g., or audio output) at 450 that a match was not found and prompt the user for an input to cancel the particular look ahead event or modify the look ahead event (e.g., by changing a date or price parameter or the like). In some cases, based on the cancellation of the look ahead event, the virtual assistant computing system 130 may command the transaction monitoring system 190 to end monitoring of electronic transactions for electronic transactions that are at least a partial match with the look ahead event.

Figure 5:
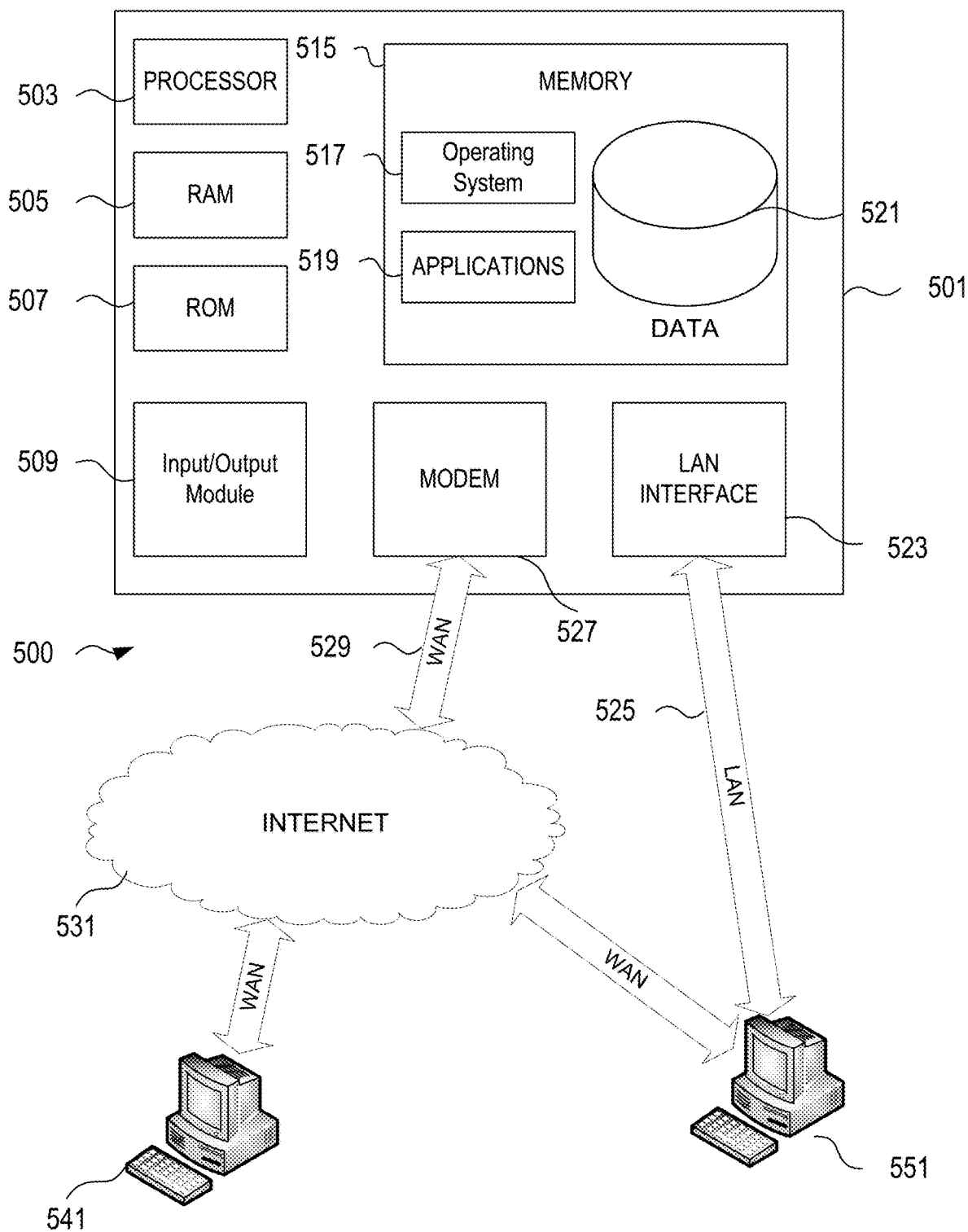
FIG. 5 shows an illustrative schematic diagram of a digital computing environment in which certain aspects of the present disclosure may be implemented according to one or more aspects of the disclosure.

FIG. 5 illustrates a block diagram of a specifically programmed computing device (e.g., a computer server 501) that may be used according to an illustrative embodiment of the disclosure. The computer server 501 may have a processor 503 for controlling overall operation of the server and its associated components, including random access memory device(s) (e.g., RAM 505), read-only memory device(s) (e.g., ROM 507), an input/output module 509, and one or more transitory and/or non-transitory memory devices (e.g., memory 515).

The Input/Output (I/O) 509 may include a microphone, keypad, touch screen, camera, and/or stylus through which a user of the computer server 501 may provide input, and may also include one or more of a speaker for providing audio output and a video display device for providing textual, audiovisual and/or graphical output. Other I/O devices through which a user and/or other device may provide input to the computer server 501 also may be included. Software may be stored within the memory 515 and/or storage to provide computer readable instructions to the processor 503 for enabling the computer server 501 to perform various technologic functions. For example, the memory 515 may store software used by the computer server 501, such as an operating system 517, an application programs 519, and/or an associated database 521. Alternatively, the computer server 501 may process some, or all, of the computer executable instructions that may be embodied in hardware and/or firmware (not shown). As described in detail above, the database 521 may provide centralized storage of characteristics associated with vendors and patrons, allowing functional interoperability between different elements located at multiple physical locations.

The computer server 501 may operate in a networked environment supporting connections to one or more remote computers, such as terminals 541 and 551. The terminals 541 and 551 may be personal computers or servers that include many or all of the elements described above relative to the computer server 501. The network connections depicted in FIG. 5 may include a local area network (LAN) 525 and/or a wide area network (WAN) 529, and may include other networks. When used in a LAN networking environment, the computer server 501 is connected to the LAN 525 through a network interface or adapter 523. When used in a WAN networking environment, the computer server 501 may include a modem 527 or other means for establishing communications over the WAN 529, such as the Internet 531. It will be appreciated that the network connections shown are illustrative and other means of establishing a communications link between the computers may be used. The existence of any of various well-known protocols such as TCP/IP, Ethernet, FTP, HTTP and the like is presumed.

The computer server 501 and/or the terminals 541 or 551 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 6:
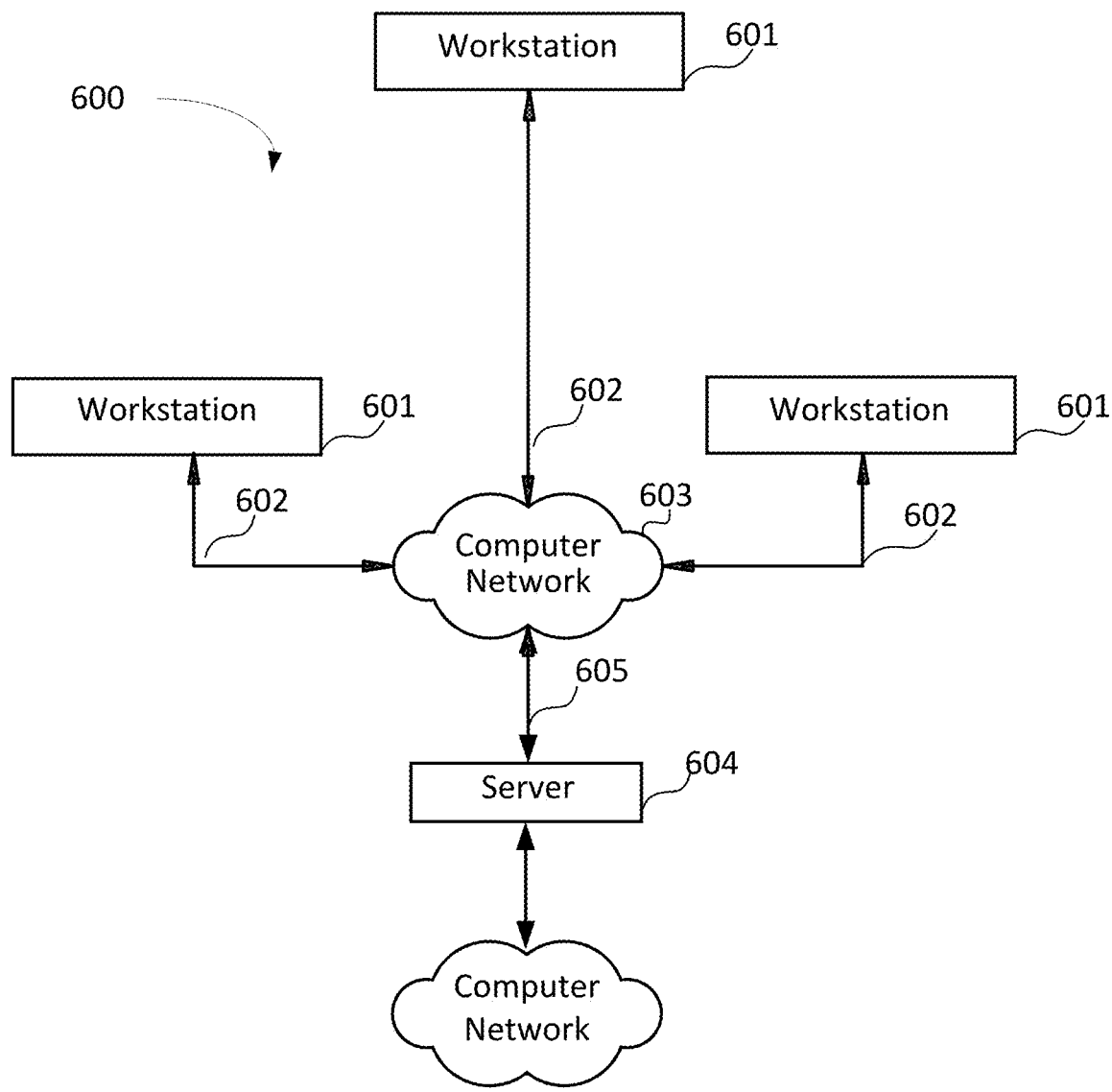
FIG. 6 shows an illustrative block diagram of mobile workstations and stationary workstations and servers that may be used to implement the processes and functions of certain illustrative examples according to one or more aspects of the disclosure.

Referring to FIG. 6, an illustrative system 600 for implementing methods according to the present disclosure is shown. As illustrated, system 600 may include one or more mobile workstations 601. The mobile workstations 601 may be local or remote, and are connected by one or more communications links 602 to computer networks 603, 610 that is linked via communications links 605 to a server 604. In the system 600, the server 604 may be any suitable server, processor, computer, or data processing device, or combination of the same. The computer network 603 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links 602 and 605 may be any communications links suitable for communicating between the workstations 601 and the server 604, such as network links, dial-up links, wireless links, hard-wired links, etc.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   causing, via a network and by a user device, display of a first user interface screen to prompt entry of a future electronic transaction that is expected to be initiated by a user;
   receiving, via the network from the first user interface screen displayed by the user device, an input of a data record corresponding to the future electronic transaction that is expected to be initiated by the user, wherein the input of the data record comprises a date range during which the future electronic transaction is expected to occur;
   analyzing, by a virtual assistant computing system using a predictive model, information corresponding to the future electronic transaction;
   predicting, based on the information, the predictive model, information from an account data store, and a plurality of scheduled electronic transaction data records received from an external computing system, a future state of an electronic account;
   causing display, on the user device via the network, a user interface screen comprising visualization of the future state of the electronic account based on the future electronic transaction, the account information, and the plurality of scheduled electronic transactions;
   monitoring, by a transaction monitoring computing system, a first plurality of electronic transaction records associated with the user;
   monitoring, by the transaction monitoring computing system, a second plurality of electronic transaction records associated with different users associated with the user's household;
   reconciling, by the virtual assistant computing system via clustering analysis of the first plurality of electronic transaction records and the second plurality of electronic transaction records associated with users associated with the user's household, actual electronic transactions with predicted electronic transactions;
   identifying, based on reconciled electronic transactions via the clustering analysis of the first plurality of electronic transaction records and the second plurality of electronic transaction records, a trend in electronic deposit transactions and/or electronic withdrawal transactions;
   causing display, at the user device, of a second user interface screen displaying reconciled actual electronic transactions matched with predicted electronic transactions;
   receiving, via the network and from the second user interface screen displayed by the user device, a second user input confirming a match between the future electronic transaction and one or more matched electronic transactions of the plurality of electronic transactions;
   enhancing, by a learning engine of the virtual assistant computing system, the predictive model used in future analysis cases of similar events and categories of look ahead events;
   identifying, based on the trend in electronic deposit transactions and/or electronic withdrawal transactions and the input confirming the match between the future electronic transaction and the one or more matched electronic transactions, a user life event; and
   causing display, at the user device, a third user interface screen presenting one or more additional look ahead events for entry into a virtual register based on a received user confirmation input corresponding to a selected additional look ahead event corresponding to the identified life event.

2. The method of claim 1, further comprising:
   calculating a predicted account value associated with the electronic account based on the future electronic transaction and the plurality of scheduled electronic transactions; and
   causing output, to the user device via the network, an output signaling whether the predicted account value falls below a threshold.

3. The method of claim 1, further comprising:
   comparing, by the virtual assistant computing system, a predicted value associated with the electronic account with a predefined threshold, wherein the predicted value is calculated based on the future electronic transaction and the plurality of scheduled electronic transactions; and
   causing output, at the user device, of an audio signal providing information of the comparison of the predicted value and the predefined threshold.

4. The method of claim 1, further comprising:
   monitoring, by the transaction monitoring computing system, a plurality of electronic transactions associated with the user;
   comparing, by the virtual assistant computing system, information associated with the plurality of electronic transactions with the future electronic transactions; and
   causing display, at the user device, a visualization of the information matched between the future electronic transaction and one or more matched electronic transactions of the plurality of electronic transactions.

5. The method of claim 4, further comprising:
   causing output, at the user device, of a user selectable input and a visualization requesting confirmation of an identified partial match between the future electronic transaction and one or more partially matched electronic transactions of the plurality of electronic transactions; and based on an input received from the user device, creating a data record comprising information merged from the future electronic transaction and the one or more partially matched electronic transactions.

6. The method of claim 4, further comprising:

causing output, by the user device based on a match between the future electronic transaction and a plurality of monitored electronic transactions, an output comprising a second visualization screen providing information regarding a lack of a match; and receiving, via the network by the virtual assistant computing system, a cancellation input the future electronic transaction; and based on the cancellation input, causing the transaction monitoring computing system to end monitoring of electronic transactions associated with the user for a possible match with the future electronic transaction.

7. The method of claim 1, wherein the visualization of the future state of the electronic account comprises a virtual register format comprising a plurality of line items, each associated with one of a scheduled electronic transaction, a recurring electronic transaction, and the future electronic transaction.

8. A system, comprising:

a user device; and a virtual assistant computing system comprising:

a first processor; and a first non-transitory memory, wherein the first non-transitory memory stores first instructions that, when executed by the first processor, cause the virtual assistant computing system to:

cause, via a network and by the user device, display of a first user interface screen to prompt entry of a future electronic transaction that is expected to be initiated by a user;

receive, via the network from the first user interface screen displayed by the user device, an input of a data record corresponding to the future electronic transaction that is expected to be initiated by the user; wherein the input of the data record comprises a date range during which the future electronic transaction is expected to occur analyze, using a predictive model, information corresponding to the future electronic transaction;

predict, based on the information, the predictive model, information from an account data store, and a plurality of scheduled electronic transaction data records received from an external computing system, a future state of an electronic account associated with the user;

cause display, on the user device via the network, a user interface screen comprising a visualization of the future state of the electronic account based on the future electronic transaction, the account information, and the plurality of scheduled electronic transactions;

receive information, from a transaction monitoring computing system, a first plurality of electronic transaction records associated with the user;

receive information, from the transaction monitoring computing system, a second plurality of electronic transaction records associated with different users associated with the user's household;

reconcile, based on clustering analysis of the first plurality of electronic transaction records and the second plurality of electronic transaction records associated with users associated with the user's household, actual electronic transaction data records with predicted electronic transaction data records;

identify, based on reconciled electronic transactions via the clustering analysis of the first plurality of electronic transaction records and the second plurality of electronic transaction records, a trend in electronic deposit transactions and/or electronic withdrawal transactions;

cause display, at the user device, of a second user interface screen displaying reconciled actual electronic transactions matched with predicted electronic transactions;

receive, via the network and from second user interface screen displaying the user device, a user input confirming a match between a future electronic transaction data record and one or more matched electronic transaction data records of the plurality of electronic transaction data records;

enhance, by a learning engine, the predictive model used in future analysis cases of similar events and categories of look ahead events;

identify, based on the trend in electronic deposit transactions and/or electronic withdrawal transactions and the input confirming the match between the future electronic transaction and the one or more matched electronic transactions, a user life event; and cause display, at the user device, a third user interface screen presenting one or more additional look ahead events for entry into a virtual register based on a user confirmation input received from the user device.

9. The system of claim 8, further comprising:

the user device comprising a second processor and a second non-transitory memory, wherein the second non-transitory memory stores second instructions, that when executed by the second processor, cause the user device to:

receive, via an input device, an input requesting entry of the future electronic transaction;

communicate, via the network, the received input to the virtual assistant computing system; and display the visualization of the future state of the electronic account.

10. The system of claim 8, wherein the first instructions, when executed by the first processor, cause the virtual assistant computing system to:

calculate a predicted account value associated with the electronic account based on the future electronic transaction and the plurality of scheduled electronic transactions; and cause output, to the user device via the network, an output signaling whether the predicted account value falls below a threshold.

11. The system of claim 8, wherein the first instructions, when executed by the first processor, cause the virtual assistant computing system to:

compare, a predicted value associated with the electronic account with a predefined threshold, wherein the predicted value is calculated based on the future electronic transaction and the plurality of scheduled electronic transactions; and cause output, at the user device, of an audio signal providing information of the comparison of the predicted value and the predefined threshold.

12. The system of claim 9, wherein the first instructions, when executed by the first processor, cause the virtual assistant computing system to:
receive, from the transaction monitoring system, a plurality of electronic transactions associated with the user;
compare, information associated with the plurality of electronic transactions with the future electronic transactions; and
cause output, at the user device, a visualization of the information matched between the future electronic transaction and one or more matched electronic transactions of the plurality of electronic transactions.

13. The system of claim 9, wherein the first instructions, when executed by the first processor, cause the virtual assistant computing system to:
cause output, at the user device, of a user selectable input and a visualization requesting confirmation of an identified partial match between the future electronic transaction and one or more partially matched electronic transactions of the plurality of electronic transactions; and
based on an input received from the user device, create a data record comprising information merged from the future electronic transaction and the one or more partially matched electronic transactions.

14. The system of claim 8, wherein the first instructions, when executed by the first processor, cause the virtual assistant computing system to:
cause output, by the user device based on a match between the future electronic transaction and a plurality of monitored electronic transactions, an output comprising a second visualization screen providing information regarding a lack of a match; and
receive, via the network by the processor, a cancellation input the future electronic transaction; and
based on the cancellation input, cause a transaction monitoring system to end monitoring of electronic transactions associated with the user for a possible match with the future electronic transaction.

15. The system of claim 8, wherein the visualization of the future state of the electronic account comprises a virtual register format comprising a plurality of line items, each associated with one of a scheduled electronic transaction, a recurring electronic transaction, and the future electronic transaction.

16. A virtual assistant computing system comprising:
a first processor; and
a first non-transitory memory, wherein the first non-transitory memory stores first instructions that, when executed by the first processor, cause the virtual assistant computing system to:
receive, via a network from a user device, an input of a data record corresponding to a future electronic transaction expected to be initiated by a user, wherein the input of the data record comprises a date range during which the future electronic transaction is expected to occur;
analyze, using a predictive model, information corresponding to the future electronic transaction;
predict, based on the information, the predictive model, information from an account data store, and a plurality of scheduled electronic transaction data records received from an external computing system, a future state of an electronic account associated with the user;
cause display, on the user device via the network, a visualization of the future state of the electronic account based on the future electronic transaction, the account information, and the plurality of scheduled electronic transactions;
receive information, from a transaction monitoring computing system, a plurality of electronic transaction records associated with the user;
receive information, from the transaction monitoring computing system, a second plurality of electronic transaction records associated with different users associated with the user's household;
reconcile, based on clustering analysis of a first plurality of electronic transaction records and the second plurality of electronic transaction records associated with users associated with the user's household, actual electronic transaction data records with predicted electronic transaction data records;
identify, based on reconciled electronic transactions via the clustering analysis of the first plurality of electronic transaction records and the second plurality of electronic transaction records, a trend in electronic deposit transactions and/or electronic withdrawal transactions;
cause display, at the user device, of a user interface screen displaying reconciled actual electronic transaction data records matched with predicted electronic transaction data records;
receive, via the network and from the user device, a user input confirming a match between a future electronic transaction data record and one or more matched electronic transaction data records of the plurality of electronic transaction data records;
enhance, by a learning engine, the predictive model used in future analysis cases of similar events and categories of look ahead events
identify, based on the trend in electronic deposit transactions and/or electronic withdrawal transactions and the input confirming the match between the future electronic transaction and the one or more matched electronic transactions, a user life event; and
cause display, at the user device, a second user interface screen presenting one or more additional look ahead events for entry into a virtual register based on a received user confirmation input corresponding to the identified life event.

17. The virtual assistant computing system of claim 16, wherein the first instructions, when executed by the first processor, cause the virtual assistant computing system to:
calculate a predicted account value associated with the electronic account based on the future electronic transaction and the plurality of scheduled electronic transactions; and
cause output, to the user device via the network, an output signaling whether the predicted account value falls below a threshold.

18. The virtual assistant computing system of claim 16, wherein the first instructions, when executed by the first processor, cause the virtual assistant computing system to:
compare, a predicted value associated with the electronic account with a predefined threshold, wherein the predicted value is calculated based on the future electronic transaction and the plurality of scheduled electronic transactions; and cause output, at the user device, of an audio signal providing information of the comparison of the predicted value and the predefined threshold.

19. The virtual assistant computing system of claim 16, wherein the first instructions, when executed by the first processor, cause the virtual assistant computing system to:

receive, from the transaction monitoring system, a plurality of electronic transactions associated with the user;

compare, information associated with the plurality of electronic transactions with the future electronic transactions; and cause output, at the user device, a visualization of the information matched between the future electronic transaction and one or more matched electronic transactions of the plurality of electronic transactions.

20. The system of claim 19, wherein the visualization of the future state of the electronic account comprises a virtual register format comprising a plurality of line items, each associated with one of a scheduled electronic transaction, a recurring electronic transaction, and the future electronic transaction.

* * * * *